United States Patent
Antony et al.

(10) Patent No.: US 12,541,715 B2
(45) Date of Patent: Feb. 3, 2026

(54) METHOD AND SYSTEM FOR FEDERATED LEARNING BASED IDENTIFICATION OF NON-MALICIOUS CLASSIFICATION MODELS

(71) Applicant: Tata Consultancy Services Limited, Mumbai (IN)

(72) Inventors: Delton Myalil Antony, Kochi (IN); Rajan Mindigal Alasingara Bhattachar, Bangalore (IN); Manoj Madhav Apte, Pune (IN); Sachin Premsukh Lodha, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 697 days.

(21) Appl. No.: 18/049,503

(22) Filed: Oct. 25, 2022

(65) Prior Publication Data

US 2023/0186159 A1 Jun. 15, 2023

(30) Foreign Application Priority Data

Dec. 8, 2021 (IN) .............................. 202121057062

(51) Int. Cl.
 *G06F 17/00* (2019.01)
 *G06N 20/00* (2019.01)

(52) U.S. Cl.
 CPC .................................. *G06N 20/00* (2019.01)

(58) Field of Classification Search
 CPC .......... G06N 20/00; G06N 5/04; G06N 5/025; G06N 7/01; G06F 17/153; G06F 17/18;

(Continued)

(56) References Cited

U.S. PATENT DOCUMENTS

2019/0114511 A1* 4/2019 Gao ........................ G06F 18/24
2019/0294990 A1 9/2019 Lopez De Prado
(Continued)

OTHER PUBLICATIONS

Yang, Wensi et al., "FFD: A Federated Learning Based Method for Credit Card Fraud Detection" International Conference on Big Data, Date: Jun. 2019, pp. 18-32, Publisher: Springer, https://www.researchgate.net/publication/333887332_FFD_A_Federated_Learning_Based_Method_for_Credit_Card_Fraud_Detection/link/62d8ad4725155478d6418202/download.

(Continued)

*Primary Examiner* — Jason T Edwards
(74) *Attorney, Agent, or Firm* — Finnegan, Henderson, Farabow, Garrett & Dunner, LLP

(57) ABSTRACT

The present disclosure provides a federated learning based identification of non-malicious classification models where the conventional model fails to perform. Initially, the system receives a local classification model from each of a plurality of clients. Further, a set of one-dimensional arrays are obtained based on a plurality of local classification models associated with the plurality of clients using a flattening technique. Further, a major cluster and a minor cluster are obtained by clustering the set of one-dimensional arrays using a clustering technique. After clustering, a plurality of active classification models are selected based on the major cluster and the minor cluster using an epsilon cluster selection technique. Further, a global classification model is selected from the plurality of active models using a random selection technique. Finally, the selected global classification model is transmitted to each of the plurality of clients.

19 Claims, 8 Drawing Sheets

(58) Field of Classification Search
CPC ............... G06F 16/285; G06F 16/2264; G06F 16/2237; G06F 7/08
USPC .......................................................... 706/12
See application file for complete search history.

(56) References Cited

U.S. PATENT DOCUMENTS

| | | | | |
|---|---|---|---|---|
| 2021/0406782 | A1* | 12/2021 | Nakayama | G06N 20/20 |
| 2022/0269977 | A1* | 8/2022 | Yu | G06N 20/00 |
| 2022/0344049 | A1* | 10/2022 | Hall | G06F 9/5066 |
| 2022/0351069 | A1* | 11/2022 | Li | G06N 3/098 |
| 2023/0046287 | A1* | 2/2023 | Bilgrami | G06F 18/24765 |
| 2023/0133127 | A1* | 5/2023 | Balabine | G06F 16/2237 |
| | | | | 707/739 |

OTHER PUBLICATIONS

Craenendonck, Toon Van et al., "Constraint-based clustering selection", Machine Learning, Date: Jun. 2017, Publisher: Arxiv, https://arxiv.org/pdf/1609.07272.pdf.

* cited by examiner

METHOD AND SYSTEM FOR FEDERATED LEARNING BASED IDENTIFICATION OF NON-MALICIOUS CLASSIFICATION MODELS

PRIORITY CLAIM

This U.S. patent application claims priority under 35 U.S.C. § 119 to: Indian Patent Application No. 202121057062, filed on Dec. 8, 2021. The entire contents of the aforementioned application are incorporated herein by reference.

TECHNICAL FIELD

The disclosure herein generally relates to the field of machine learning and, more particular, to a method and system for federated learning based identification of non-malicious classification models.

BACKGROUND

Fraudulent transaction detection is an important problem in the banking domain since it causes huge monetary loss. Contemporary data driven fraudulent transaction detection strategies generally use transactions dataset of a bank to train a model and then the trained model is used to classify whether a new transaction is fraudulent or not in real time. A unique limitation of this particular problem is that, even if labelled data is readily available, the ratio of fraudulent to genuine transactions is highly skewed. For example, there is a possibility that in a set of thousand transactions, only one may be fraudulent. Hence it is important for banks to learn up on the different types of fraudulent transactions that occur across different banks so that one bank will be aware of a new fraudulent transaction that occurred on another bank comes its way. Hence, a model of a bank should be generalized across all types of fraudulent transactions which can only be done by collaboration between banks through Federated Learning (FL)

Conventional methods are facing two major challenges to build federated fraudulent transaction detection model. The challenges includes (i) the distribution of the datasets held by each of the participating banks are different from each other which impacts the robustness of the federated learning model and (ii) providing malicious model updates (model poisoning) to the server by the clients. Further the conventional methods suffer from false positives tagged by malicious clients. These two challenges are solved by the conventional methods in a mutually exclusive manner. Thus, a holistic FL based method to address the said challenges is not available.

SUMMARY

Embodiments of the present disclosure present technological improvements as solutions to one or more of the above-mentioned technical problems recognized by the inventors in conventional systems. For example, in one embodiment, a method for federated learning based identification of non-malicious classification models is provided. The method includes receiving, by one or more hardware processors, a local classification model from each of a plurality of clients. The local classification model is pretrained to classify a plurality of transactions corresponding to each of the plurality of clients as one of, a plurality of malicious transaction and a plurality of non-malicious transaction. Further, the method includes obtaining, by the one or more hardware processors, a set of one dimensional array based on a plurality of local classification models associated with the plurality of clients using a flattening technique. Furthermore, the method includes obtaining, by the one or more hardware processors, a major cluster and a minor cluster by clustering the set of one-dimensional arrays using a clustering technique. Furthermore, the method includes selecting, by the one or more hardware processors, a plurality of active classification models based on the major cluster and the minor cluster using an epsilon cluster selection technique by: (i) computing a Silhouette coefficient for the clustering technique, wherein the Silhouette coefficient indicates the efficiency of the clustering technique (ii) computing an epsilon probability value based on the Silhouette coefficient and a plurality of global parameters, wherein the plurality of global parameters are obtained based on a plurality of hyperparameters using a pretrained model, and wherein the plurality of hyperparameters characterize a precise filtering of the plurality of active classification models and (iii) selecting the plurality of active models from the plurality of local classification models based on the epsilon probability value and a random number. Furthermore, the method includes selecting, by the one or more hardware processors, a global classification model from the plurality of active models using a random selection technique. Finally, the method includes transmitting, by one or more hardware processors, the selected global classification model to each of the plurality of clients.

In another aspect, a system for federated learning based identification of non-malicious classification models is provided. The system includes a plurality of clients connected to a server, wherein the server comprises at least one memory storing programmed instructions, one or more Input/Output (I/O) interfaces, and one or more hardware processors operatively coupled to the at least one memory, wherein the one or more hardware processors of the server are configured by the programmed instructions to receive a local classification model from each of a plurality of clients. The local classification model is pretrained to classify a plurality of transactions corresponding to each of the plurality of clients as one of, a plurality of malicious transaction and a plurality of non-malicious transaction. Further, the one or more hardware processors of the server are configured by the programmed instructions to obtain a set of one dimensional arrays based on a plurality of local classification models associated with the plurality of clients using a flattening technique. Furthermore, the one or more hardware processors of the server are configured by the programmed instructions to obtain a major cluster and a minor cluster by clustering the set of one-dimensional arrays using a clustering technique. Furthermore, the one or more hardware processors of the server are configured by the programmed instructions to select a plurality of active classification models based on the major cluster and the minor cluster using an epsilon cluster selection technique by: (i) computing a Silhouette coefficient for the clustering technique, wherein the Silhouette coefficient indicates the efficiency of the clustering technique (ii) computing an epsilon probability value based on the Silhouette coefficient and a plurality of global parameters, wherein the plurality of global parameters are obtained based on a plurality of hyperparameters using a pretrained model, and wherein the plurality of hyperparameters characterize a precise filtering of the plurality of active classification models and (iii) selecting the plurality of active models from the plurality of local classification models based on the epsilon probability value and a random number. Furthermore, the one or more hardware processors of the server are configured by the programmed instructions to select a global classification model from the plurality of active models using a random selection technique. Finally, the one or more hardware processors of the server are configured by the programmed instructions to transmit the selected global classification model to each of the plurality of clients.

In yet another aspect, a computer program product including a non-transitory computer-readable medium having embodied therein a computer program for federated learning based identification of non-malicious classification models is provided. The computer readable program, when executed on a computing device, causes the computing device to receive a local classification model from each of a plurality of clients. The local classification model is pretrained to classify a plurality of transactions corresponding to each of the plurality of clients as one of, a plurality of malicious transaction and a plurality of non-malicious transaction. Further, computer readable program, when executed on a computing device, causes the computing device to obtain a set of one dimensional arrays based on a plurality of local classification models associated with the plurality of clients using a flattening technique. Furthermore, computer readable program, when executed on a computing device, causes the computing device to obtain a major cluster and a minor cluster by clustering the set of one-dimensional arrays using a clustering technique. Furthermore, computer readable program, when executed on a computing device, causes the computing device to select a plurality of active classification models based on the major cluster and the minor cluster using an epsilon cluster selection technique by: (i) computing a Silhouette coefficient for the clustering technique, wherein the Silhouette coefficient indicates the efficiency of the clustering technique (ii) computing an epsilon probability value based on the Silhouette coefficient and a plurality of global parameters, wherein the plurality of global parameters are obtained based on a plurality of hyperparameters using a pretrained model, and wherein the plurality of hyperparameters characterize a precise filtering of the plurality of active classification models and (iii) selecting the plurality of active models from the plurality of local classification models based on the epsilon probability value and a random number. Furthermore, computer readable program, when executed on a computing device, causes the computing device to select a global classification model from the plurality of active models using a random selection technique. Finally, computer readable program, when executed on a computing device, causes the computing device to transmit the selected global classification model to each of the plurality of clients.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
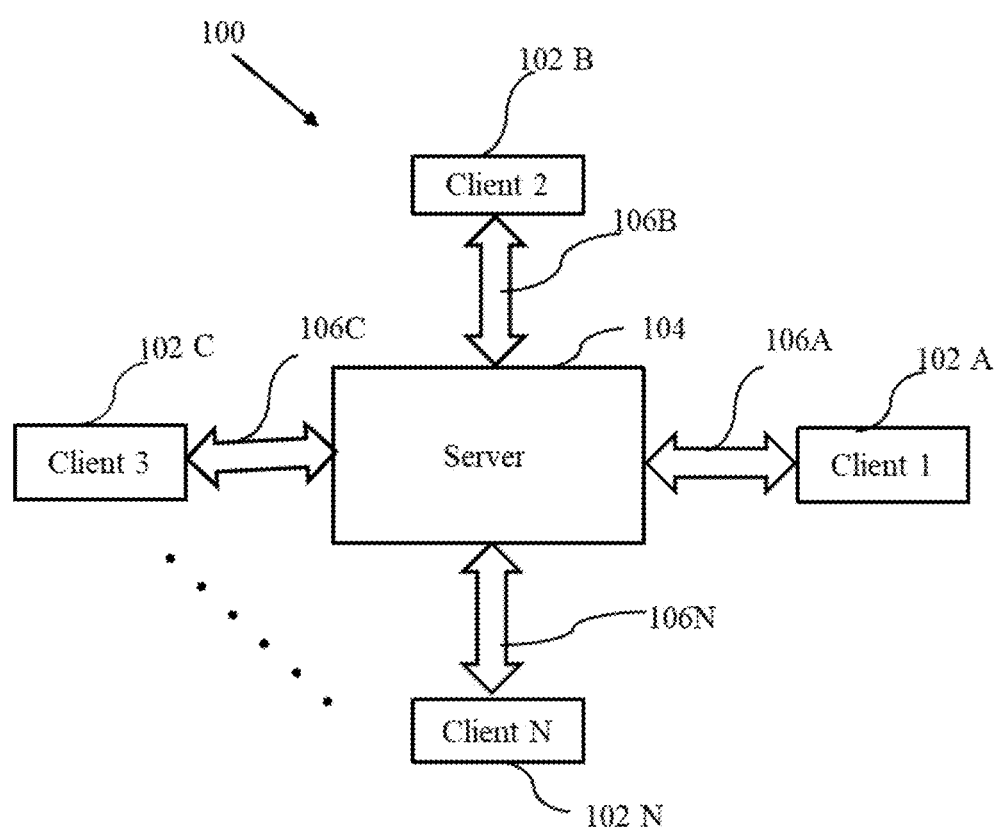
FIG. 1 is a client server architecture for a system for federated learning based identification of non-malicious classification models, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Embodiments herein provide a method and system for federated learning based identification of non-malicious classification models. Initially, the system receives a local classification model from each of a plurality of clients. The local classification model is pretrained to classify a plurality of transactions corresponding to each of the plurality of clients as one of, a plurality of malicious transaction and a plurality of non-malicious transaction. Further, a set of one-dimensional arrays are obtained based on a plurality of local classification models associated with the plurality of clients using a flattening technique. Further, a major cluster and a minor cluster are obtained by clustering the set of one-dimensional arrays using a clustering technique. After clustering, a plurality of active classification models are selected based on the major cluster and the minor cluster using an epsilon cluster selection technique. Further, a global classification model is selected from the plurality of active models using a random selection technique. Finally, the selected global classification model is transmitted to each of the plurality of clients.

Referring now to the drawings, and more particularly to FIGS. 1 through 5D, where similar reference characters denote corresponding features consistently throughout the figures, there are shown preferred embodiments and these embodiments are described in the context of the following exemplary system and/or method.

FIG. 1 is a client server architecture for a system 100 for federated learning based identification of non-malicious classification models, in accordance with some embodiments of the present disclosure. The architecture 100 includes a plurality of clients 102A, 102B, . . . , 102N, a server 104 and a plurality of network connections 106A, 106B . . . 106N. Each of the plurality of network connections 106A to 106N connects each of the corresponding plurality of clients to the server 104. For example, the client 102A is connected to the server 104 through the network connection 106A. Similarly, other clients are connected to the server using the corresponding network connection. The plurality of clients 102A, 102B, . . . , 102N are not connected to each other. In an embodiment, each of the plurality of network connections 106A through 106N is a wired communication network or a wireless communication network.

Figure 2:
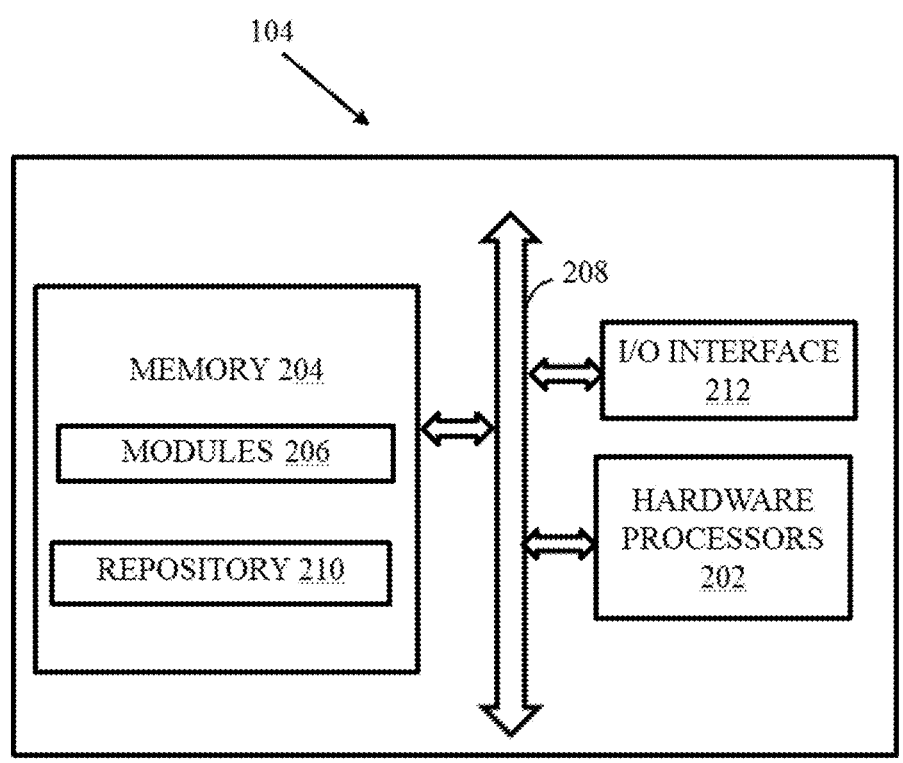
FIG. 2 is a functional block diagram of a server and a plurality of clients of the system of federated learning based identification of non-malicious classification models, implemented by the system of FIG. 1, in accordance with some embodiments of the present disclosure.

FIG. 2 is a functional block diagram 200 of a server 104 and a plurality of clients of the system for federated learning based identification of non-malicious classification models, implemented by the architecture of FIG. 1, in accordance with some embodiments of the present disclosure. The system 200 includes or is otherwise in communication with hardware processors 202, at least one memory such as a memory 204, an I/O interface 212. The hardware processors 202, memory 204, and the Input/Output (I/O) interface 212 may be coupled by a system bus such as a system bus 208 or a similar mechanism. In an embodiment, the hardware processors 202 can be one or more hardware processors.

The I/O interface 212 may include a variety of software and hardware interfaces, for example, a web interface, a graphical user interface, and the like. The I/O interface 212 may include a variety of software and hardware interfaces, for example, interfaces for peripheral device(s), such as a keyboard, a mouse, an external memory, a printer and the like. Further, the I/O interface 212 may enable the system 200 to communicate with other devices, such as web servers, and external databases.

The I/O interface 212 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 212 may include one or more ports for connecting several computing systems with one another or to another server computer. The I/O interface 212 may include one or more ports for connecting several devices to one another or to another server.

The one or more hardware processors 202 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 202 is configured to fetch and execute computer-readable instructions stored in the memory 204.

The memory 204 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 204 includes a plurality of modules 206. The memory 204 also includes a data repository (or repository) 210 for storing data processed, received, and generated by the plurality of modules 206.

The plurality of modules 206 include programs or coded instructions that supplement applications or functions performed by the system 200 for federated learning based identification of non-malicious classification models. The plurality of modules 206, amongst other things, can include routines, programs, objects, components, and data structures, which performs particular tasks or implement particular abstract data types. The plurality of modules 206 may also be used as, signal processor(s), node machine(s), logic circuitries, and/or any other device or component that manipulates signals based on operational instructions. Further, the plurality of modules 206 can be used by hardware, by computer-readable instructions executed by the one or more hardware processors 202, or by a combination thereof. The plurality of modules 206 can include various sub-modules (not shown). The plurality of modules 206 may include computer-readable instructions that supplement applications or functions performed by the system 200 for federated learning based identification of non-malicious classification models. In an embodiment, the plurality of modules 206 include a receiving module (shown in FIG. 4), a flattening module (shown in FIG. 4), a clustering module (shown in FIG. 4), an active models selection module (shown in FIG. 4), a global model selection module (shown in FIG. 4) and a transmission module (shown in FIG. 4).

The data repository (or repository) 210 may include a plurality of abstracted piece of code for refinement and data that is processed, received, or generated as a result of the execution of the plurality of modules in the module(s) 206.

Although the data repository 210 is shown internal to the system 200, it will be noted that, in alternate embodiments, the data repository 210 can also be implemented external to the system 200, where the data repository 210 may be stored within a database (repository 210) communicatively coupled to the system 200. The data contained within such external database may be periodically updated. For example, new data may be added into the database (not shown in FIG. 2) and/or existing data may be modified and/or non-useful data may be deleted from the database. In one example, the data may be stored in an external system, such as a Lightweight Directory Access Protocol (LDAP) directory and a Relational Database Management System (RDBMS).

Figure 3:
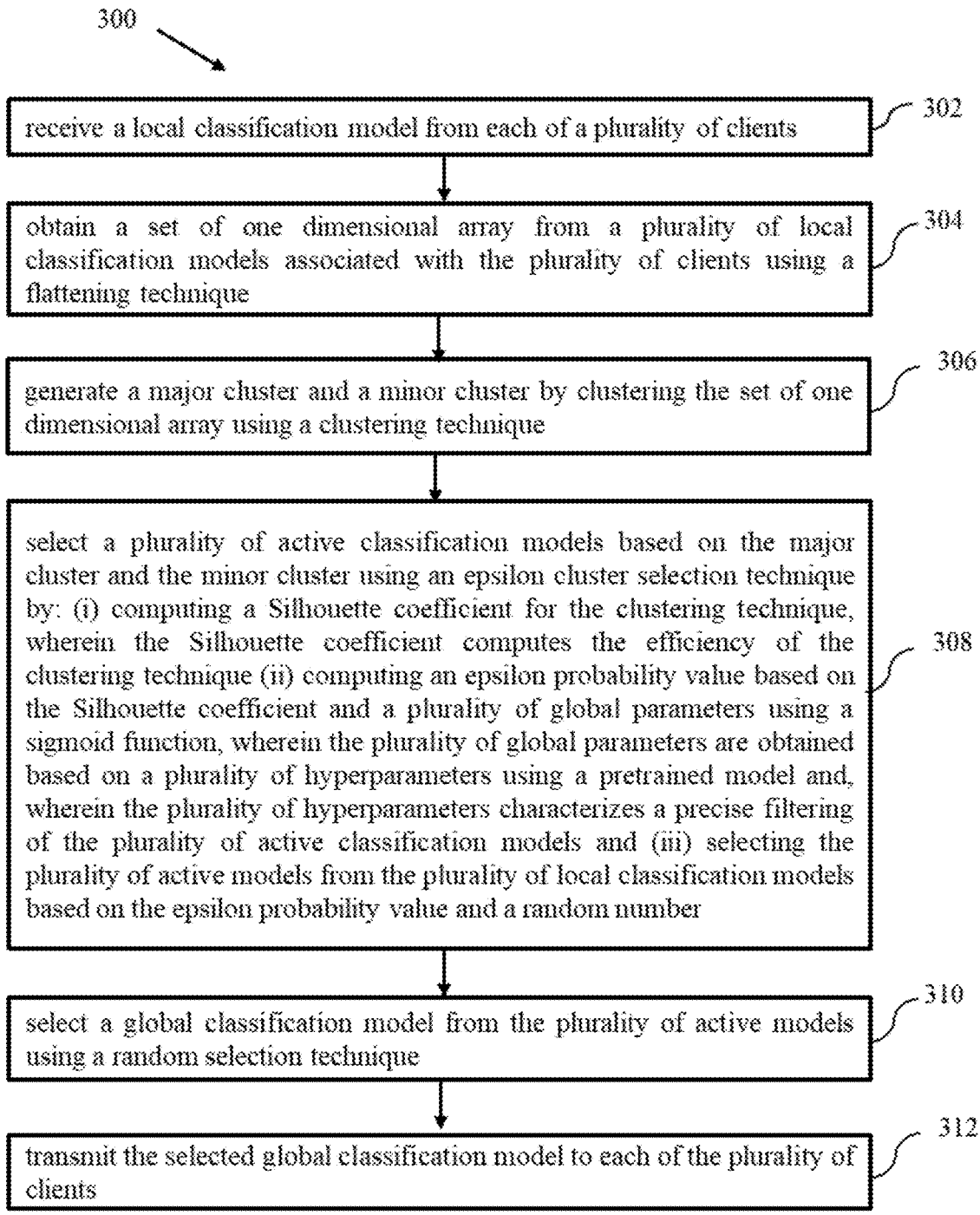
FIG. 3 is an exemplary flow diagram illustrating the processor implemented method for federated learning based identification of non-malicious classification models implemented by the server of FIG. 1, in accordance with some embodiments of the present disclosure.

FIG. 3 is an exemplary flow diagram illustrating the processor implemented method 300 for federated learning based identification of non-malicious classification models implemented by the server of FIG. 1, in accordance with some embodiments of the present disclosure.

In an embodiment, the system 200 includes one or more data storage devices or the memory 204 operatively coupled to the one or more hardware processor(s) 202 and is configured to store instructions for execution of steps of the method 300 by the one or more hardware processors 202. The steps of the method 300 of the present disclosure will now be explained with reference to the components or blocks of the system 100 and the system 200 as depicted in FIGS. 1 and 2 and the steps of flow diagram as depicted in FIG. 3. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communication network. The order in which the method 300 is described is not intended to be construed as a limitation, and any number of the described method blocks can be combined in any order to implement the method 300, or an alternative method. Furthermore, the method 300 can be implemented in any suitable hardware, software, firmware, or combination thereof.

At step 302 of the method 300, the one or more hardware processors 102 are configured by the programmed instructions to receive a local classification model from each of a plurality of clients. In an embodiment, the plurality of clients represents a plurality of banks. The local classification model is pretrained to classify a plurality of transactions corresponding to each of the plurality of clients as one of, a plurality of malicious transaction and a plurality of non-malicious transaction.

At step 304 of the method 300, the one or more hardware processors 102 are configured by the programmed instructions to obtain a set of one dimensional array from a plurality of local classification models associated with the plurality of clients using a flattening technique. In an embodiment, the flattening technique used here is Principal Component Analysis (PCA). Similar other techniques are also used for flattening. In an embodiment, the one-dimensional array includes the vector representation of each of the plurality of local classification models. For example, the set of one dimensional array is represented as [$\{v_1\}, \{v_2\}, \{v_3\} \ldots \{v_n\}$]. Here, the $v_1$ is the flattened vector corresponding to the local classification model associated with the client 1. Similarly, $v_n$ is the flattened vector corresponding to the local classification model associated with the client n.

For example, considering the number of participating banks as 10 and are represented as $B_1, B_2, \ldots B_{10}$. The server Initializes a model M and is passed on to all the 10 banks. The banks will use this model M as the initial model and train their own local copies $M_1, M_2, \ldots M_{10}$ based on the corresponding datasets $D_1, D_2 \ldots D_{10}$. Now the banks will send these models $M_1, M_2, \ldots M_{10}$ to the server. Server collects it and store it in set W called the (entire) model set. The server flattens these models into 1D vectors as $v_1, v_2 \ldots v_{10}$.

At step 306 of the method 300, the one or more hardware processors 102 are configured by the programmed instructions to generate a major cluster and a minor cluster by clustering the set of one dimensional array using a clustering technique. In an embodiment, the k-means clustering technique is used for clustering. For example, the vectors [$\{v_1\}, \{v_2\}, \{v_3\} \ldots \{v_{10}\}$] are clustered with num_clusters=2 which results in two clusters L and S, the larger and Smaller cluster respectively.

At step 308 of the method 300, the one or more hardware processors 102 are configured by the programmed instructions to select a plurality of active classification models based on the major cluster and the minor cluster using an epsilon cluster selection technique. The epsilon cluster selection technique includes the following steps. Initially, a Silhouette coefficient is computed for the clustering technique. The Silhouette coefficient indicates the efficiency of the clustering technique. Further, an epsilon probability value is computed based on the Silhouette coefficient and a plurality of global parameters using a sigmoid function. The plurality of global parameters is obtained based on a plurality of hyperparameters using a pretrained model. The plurality of hyperparameters characterizes a precise filtering of the plurality of active classification models. Finally, the plurality of active models are selected from the plurality of local classification models based on the corresponding epsilon probability value and a random number between 0.0 and 1.0. The random number is generated by a pseudo random number generation technique. A set of local classification models associated with the major cluster is selected as the plurality of active models if the random number is less than the epsilon probability. The plurality of local classification models are selected as the plurality of active models if the random number is greater than the epsilon probability. The Silhouette coefficient is alternatively referred as Silhouette score.

In an embodiment, the Silhouette score is used to evaluate the quality of clusters created using clustering algorithms such as K-Means in terms of how well samples are clustered with other samples that are similar to each other. The Silhouette score is calculated for each sample of different clusters. The Silhouette score is computed using the formula given in equation (1).

$$s=(b-a)/\max(a,b) \qquad (1)$$

Now referring to equation (1), 's' is the Silhouette score, 'a' is a mean distance between an observation data point and all other data points in the same cluster. This distance is also called as mean intra-cluster distance. 'b' is a mean distance between the observation data point and all other data points of the next nearest cluster. This distance is also called as mean nearest cluster distance. The value of the Silhouette score varies from −1 to 1. If the score is 1, the cluster is dense and well-separated than other clusters. A value near 0 represents overlapping clusters with samples very close to the decision boundary of the neighboring clusters. A negative score [−1, 0] indicates that the samples might have got assigned to the wrong clusters. For example, the clustering performed by the clustering technique is evaluated using the metric Silhouette score to get s. The goal is to select an active set A. There are two possibilities either to select L as A or select W as A, where W is the entire model set. (Also W=L U S (U stands for set operation Union)). For choosing from either of these possibilities, the Silhouette-score s is transformed into probability epsilon using the silhouette to epsilon logic as given in equation (2).

$$\varepsilon=(W_\varepsilon * x + b_\varepsilon) \qquad (2)$$

Further, based on epsilon probability ε, one of L or W is selected as the active set as follows:
Generate random number r between 0.0 and 1.0
If r<ε:
    choose L as A
Else:
    choose W as A After selecting the active set A, a classification model is selected from A at random to get global model M for the next federated round. In the formula for calculating ε, weight $W_\varepsilon$ and bias $b_\varepsilon$ are utilized. These are computed once per federated learning process. This is done when server is launched and initialized. The user chooses two hyperparameters p and q, from the range of silhouette-score. p is the Silhouette coefficient value that should ideally transform into a probability 0.5. q is a Silhouette coefficient value that should ideally transform into a probability 0.9. Once p and q are obtained, the sigmoid function is computed with the data using equation (2), wherein x is the vector that represents Silhouette coefficient inputs [0, 1, p, q] and y is the vector representing their ideal epsilon values [0, 1, 0.5, 0.9]. Once training converges, the final values for weight $W_\varepsilon$ and bias $b_\varepsilon$ which can reside in the server throughout the FL process so that the server can transform any Silhouette coefficient s it receives during a federated round into an epsilon (ε) probability using the equation (2).

In an embodiment, the method of obtaining the plurality of global parameters by the pretrained includes the following steps. Initially, a plurality of hyperparameters are initialized based on the Silhouette coefficient. For example, the initialized values of the plurality of hyperparameters are in the range of Silhouette coefficient. Further, a plurality of parameters associated with a sigmoid activation function are optimized based on the plurality of hyperparameters until a minimum loss is obtained. The plurality of parameters associated with the sigmoid activation function comprises a weight parameter and a bias parameter. Finally, the plurality of parameters associated with the sigmoid activation with minimum loss are selected as the plurality of global parameters.

The Silhouette score is used to generate a probability E (epsilon probability) which enabled the chance of choosing the largest cluster over the entire active set. Initially, a linear scaling of Silhouette-score to ε is done. However, a sigmoid function is used later to fit using two pivot-points taken from Silhouette-score's range. The first pivot point p may provide an ε value of 0.5 (equal probability) and the second point q may lead to an ε value of 0.9 (high probability to choose largest cluster). The pivot points p and q are hyperparameters defined to be manually tuned to vary the strictness of the filtering process done against malicious nodes detected in the minority cluster. This also makes sure that when Silhouette-score is low (indicates the clusters are not well defined), then the disparity between the models could be due to their non-IID nature. Then present disclosure ideally treats all models as equals. Thus, using selection instead of aggregation also ensures that probability of a malicious bank contributing to the global model is minimized even if a malicious bank's model is part of the largest cluster.

At step 310 of the method 300, the one or more hardware processors 102 are configured by the programmed instructions to select a global classification model from the plurality of active models using a random selection technique. Here, a global classification model is selected at random from the plurality of active models. In another embodiment, the plurality of active models are aggregated to generate an aggregated model and the aggregated model is considered as the global classification model.

At step 310 of the method 300, the one or more hardware processors 102 are configured by the programmed instructions to transmit the selected global classification model to each of the plurality of clients.

Figure 4:
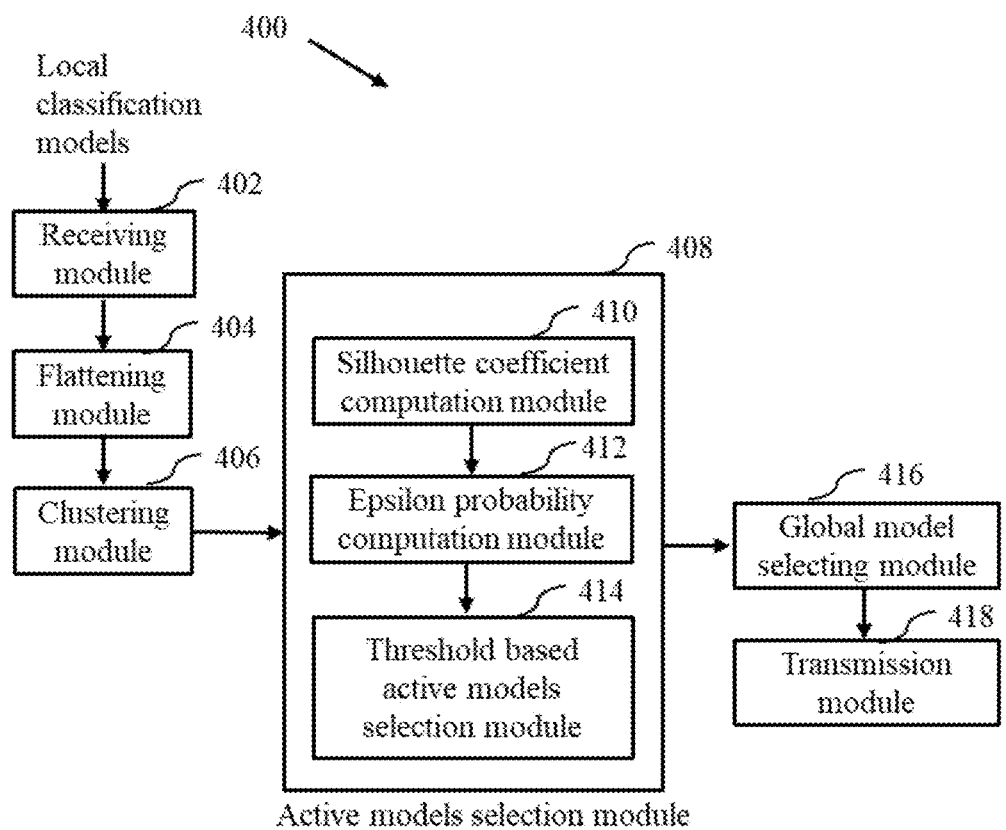
FIG. 4 is an example functional architecture for the processor implemented method for federated learning based identification of non-malicious classification models implemented by the server of FIG. 1, in accordance with some embodiments of the present disclosure.

FIG. 4 is an example functional architecture 400 for the processor implemented method for federated learning based identification of non-malicious classification models implemented by the server of FIG. 1, in accordance with some embodiments of the present disclosure. Now referring to FIG. 4, the functional architecture 400 includes a receiving module 402, a flattening module 404, a clustering module 406, an active models selection module 408, a global model selection module 416 and a transmission module 418. The active models selection module 408 further includes a Silhouette coefficient computation module 410, an epsilon probability computation module 412 and a threshold based active models selection module 414. The receiving module 402 receives the local classification model from each of the plurality of clients. The flattening module 404 obtains the set of one-dimensional array from the plurality of local classification models associated with the plurality of clients using the flattening technique. The clustering module 406 generates the major cluster and the minor cluster by clustering the set of one-dimensional array using the clustering technique. The active models selection module 408 initially computes the Silhouette coefficient for the clustering technique by the Silhouette coefficient computation module 410. The Silhouette coefficient computes the efficiency of the clustering technique. The active models selection module 408 further computes the epsilon probability value based on the Silhouette coefficient and a plurality of global parameters using a sigmoid function by the epsilon probability computation module 412. The plurality of global parameters are obtained based on a plurality of hyperparameters using the pretrained model. The plurality of hyperparameters characterizes the precise filtering of the plurality of active classification models. Finally, the active models selection module 408 selects the plurality of active models from the plurality of local classification models based on the corresponding epsilon probability value and the random number using the threshold based active models selection module 414. The global classification model is selected from the plurality of active models using a random selection technique by the global model selection module 416 and the selected global classification models are further transmitted to each of the plurality of clients by the transmission module 418.

In an embodiment, a pseudocode for the processor implemented method for federated learning based identification of non-malicious classification models is given below.

```
//Client execute:
    Function ClientUpdate (k, w)
        B ← (Subset of data from D_k)
        for each local epoch i from 1 to E do
            for batch b ∈ B do
                ω ← ω − η∇l(w, b)
        return ω to server
//Server executes:
Function GetParams (p, q):
    Set inputs as x = [0, 1, p, q]
    Set targets as y = [0, 1, 0.5, 0.9]
    Initialize weight and bias parameters W_ε and b_ε
    Fit for parameters W_ε and b_ε with objective
        σ(W_ε * x + b_ε) = y
    return W_ε and b_ε
Function GetEpsilon (Silhouette_score):
    return σ(W_ε * Silhouette_score + b_ε)
Function Main:
initialize ω_0
global W_ε and b_ε = GetParams(p, q)
    for each round t = 1,2, ... do
        initialize model set W_{t+1} ← { }
        initialize active set A_{t+1} ← { }
        for each client k ∈ S_t in parallel do
            ω_{t+1}^k ← ClientUpdate (k, ω_t)
            append ω_{t+1}^k to W_{t+1}
        L, S, Silhouette_score ← K_means(W_{t+1}, num_clusters = 2)
        ε ← GetEpsilon(Silhouette_score)
        with probability ε choose L as A_{t+1} else
            choose W_{t+1} as A_{t+1}
        randomly select a model say, ω_{t+1}^s from A_{t+1}
        ω_{t+1} ← ω_{t+1}^s
```

Now referring to the above pseudocode, $S_t$ is the plurality of clients. Set L and set S are the largest and smallest clusters respectively resulted from clustering. $D_k$ is the dataset held by client k. $W_ε$ and $b_ε$ are maintained in global scope on the server. p and q are the pivot points where p is the silhouette-score that should produce E value of 0.5 and q should produce 0.9. ε is the probability with which the largest cluster of models is chosen as active set $A_{t+1}$ as opposed to the whole model set $W_{t+1}$. The function ClientUpdate (k, w) is executed by each of the plurality of clients. Here, each client/bank trains a model using its own dataset for a specific number of epochs or batches within an epoch. The function GetParams(p, q) is executed by the server after initialization of the FL process to find the values of weight parameter $W_ε$ and bias parameter $b_ε$. The input to this is the user defined hyperparameters p and q. The output of thus function is the updated weight $W_ε$ and bias $b_ε$ which are later used to transform silhouette score to epsilon probability. The function GetEpsilon (Silhouette_score) is a transformation function that converts a given silhouette score to an epsilon probability in the range of 0 to 1. This is a nonlinear transformation using the sigmoid curve.

In an embodiment, the present disclosure is experimented as follows: The present disclosure is implemented using Syft (a federated learning library). The experimental setup includes a server and ten clients defined using the Virtual Worker abstraction of Syft. None of the clients were allowed to communicate with each other. The server had direct links to each of the clients. The server follows synchronous aggregation strategy, where the server will wait for all the clients to update their respective models to the server during a federated round. Once the server receives all the local models, it will perform aggregation or selection.

Further, a neural architecture is designed with ten layers and residual (skip) connections between the layers. The network was initialized by the server using Glorot initialization. For each federated round, the local model is trained for five epochs as a larger number of local epochs led to over-fitting as federated training progressed. For simulation, the local models are trained sequentially. Once the local models are trained, they are sent to the server. This is done one after the other. In practice, local models are trained and retrieved in parallel. Experiments were executed in an nVidia Tesla V100 GPU on DGX-1 system.

Procuring real world banking transaction datasets proved to be difficult. Hence, the present disclosure utilized synthetic dataset called Paysim. There are a total of 6,362,620 training examples in the data. The dataset is highly skewed with the proportion of positive points in the dataset being 0.001. The dataset is split into ten different partitions in two ways. For example, the two ways include an IID (Independent and Identically Distributed) split for benchmark and a non-IID split for experimentation. These ten partitions are considered to represent the datasets of ten banks during experimentation.

As part of the experimentation, it is assumed that the datasets across the banks have same feature space. Also, the transactions do not overlap between banks. Naturally, this means that the same transaction cannot occur in two or more banks. Hence, it is confirmed that to a purely horizontal variant of FL with respect to data partitioning. Here ten participating banks are considered and during each federated round, they provide a locally trained model to the server for aggregation without fail.

In the real world, federated learning is used to train a generalized model using data from multiple silos or devices with different distributions. For this, datasets with the same feature space from multiple banks that operate differently (non-IID) are needed. It is difficult to acquire such real world datasets, especially from banks and hence such a setting was simulated using an available fraudulent transaction detection dataset. For experimentation, ten banks with distinct behaviours are tested to compute the resilience of our algorithm against cross-silo non-IID data. Hence, k-means clustering is used on the dataset with K=10. The resultant clusters were non-IID as denoted by a Davies-Bouldin score of 0.716. Further, these ten clusters are assigned as ten cross-silo non-IID datasets assumed to be from ten banks which could challenge our federated aggregation algorithm. Finally, as a benchmark for an ideal case where all banks operate similarly (IID), a random split of the dataset into 10 silos is done. For each trial of our experiment, out of ten banks, we set a total number of 0, 1, 2 and 3 banks as malicious. In general, out of n=3t+1 banks, t banks can be malicious. In an embodiment, a model is said to be malicious if it is trained from a client's data set whose one or more data labels are flipped. In an embodiment, in label flipping a label field of a transaction is flipped from '0' to '1' or from '1' to '0'. For example, the label field for a genuine transaction is set to '1' and for fraudulent transaction, the label field is set to '0'. The label flipping alters the genuine transaction as the fraudulent transaction and vice versa.

For a balanced classification problem, accuracy is be the best metric to measure the predictive power of the model. However, this is not the case here. Fraudulent transaction detection, as well as any other types of fraud or anomaly detection will be highly imbalanced. Hence, a f1-score is used as metric. The f1-score is defined as the harmonic mean of precision and recall. The average of f1-scores of all the banks which are detected as non-malicious by the algorithm.

For both IID and non-IID settings, the experiment is repeated four times with respect to the number of malicious banks. In an embodiment, the malicious bank is simulated by training the bank with the flipped dataset (fraudulent). Initially, no malicious banks were set. Then one, two and three banks as malicious for the subsequent experiments for that IID or non-IID setting. For comparison, trained centralized models on the data are used for an equivalent number of epochs and the centralized benchmarks are shown in Table. I.

TABLE I

| Sl. No | Percentage of malicious data in the data set | f1_score |
|---|---|---|
| 1 | 0% | 0.77 |
| 2 | 10% | 0.75 |
| 3 | 20% | 0.45 |
| 4 | 30% | 0.45 |

The result of the experiments is summarized on Table. II. Now referring to Table II, in all cases of non-IID experiments, the present disclosure performed at least as good as the conventional methods. Moreover, the present disclosure also performed better in the IID setting when the number of malicious banks were kept as 2 and 3.

TABLE II

| Sl. No | Setting | Number of malicious banks out of 10 banks | f1 (conventional method) | f1 (present disclosure) |
|---|---|---|---|---|
| 1 | IID | 0 | 0.65 | 0.59 |
| 2 | | 1 | 0.59 | 0.59 |
| 3 | | 2 | 0.58 | 0.59 |
| 4 | | 3 | 0.49 | 0.62 |
| 1 | Non-IID | 0 | 0.56 | 0.58 |
| 2 | | 1 | 0.53 | 0.53 |
| 3 | | 2 | 0.42 | 0.58 |
| 4 | | 3 | 0.39 | 0.65 |

In addition to the results in terms of f1-scores, unlike the conventional methods, the present disclosure was also able to correctly identify the malicious banks despite the high model variance. This helps the server to flag banks which are acting suspicious during training. As part of experimentation, to demonstrate the detection of malicious banks by the present disclosure, the banks 9, 2 and 1 are simulated as malicious (since they had the highest imbalance ratio).

FIGS. 5A to 5D illustrates experimental details for the processor implemented method for federated learning based identification of non-malicious classification models implemented by the system of FIG. 1, in accordance with some embodiments of the present disclosure.

Figure 5A:
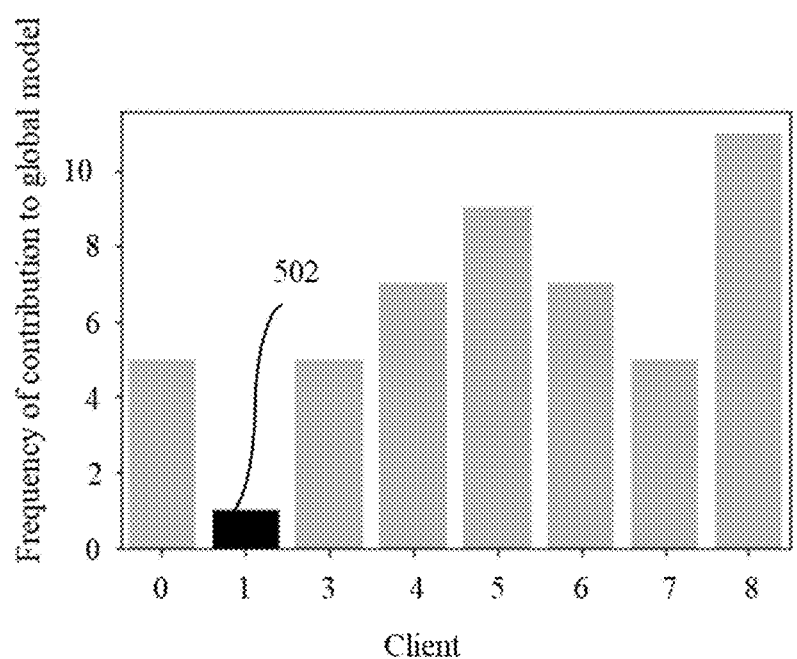
FIGS. 5A through 5D illustrates experimental details for the processor implemented method for federated learning based identification of non-malicious classification models implemented by the system of FIG. 1, in accordance with some embodiments of the present disclosure.

For IID setting with three malicious banks, the present disclosure prevented two out of the three malicious banks from contributing to the global model as seen in FIG. 5A.

Now referring to FIG. 5A, x-axis indicates banks and the y-axis indicates a number of times a bank is selected as the global model in a federated round. It is evident from FIG. 5A that out of all three malicious banks, only one bank 502, ie bank 1 is selected, that too, only once out of a total of 50 federated rounds. This implies that the present disclosure works to detect and prevent malicious models from contributing to global model with high probability.

Figure 5B:
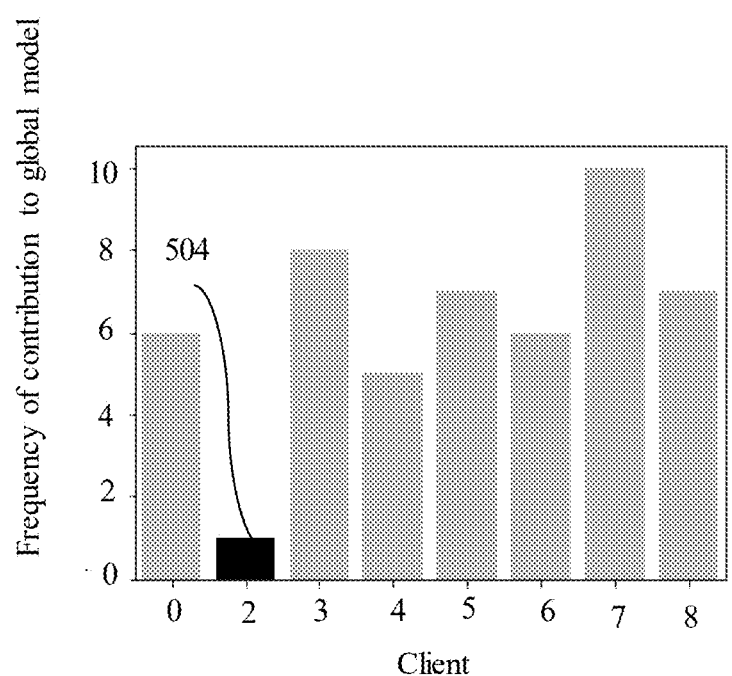
Figure 5C:
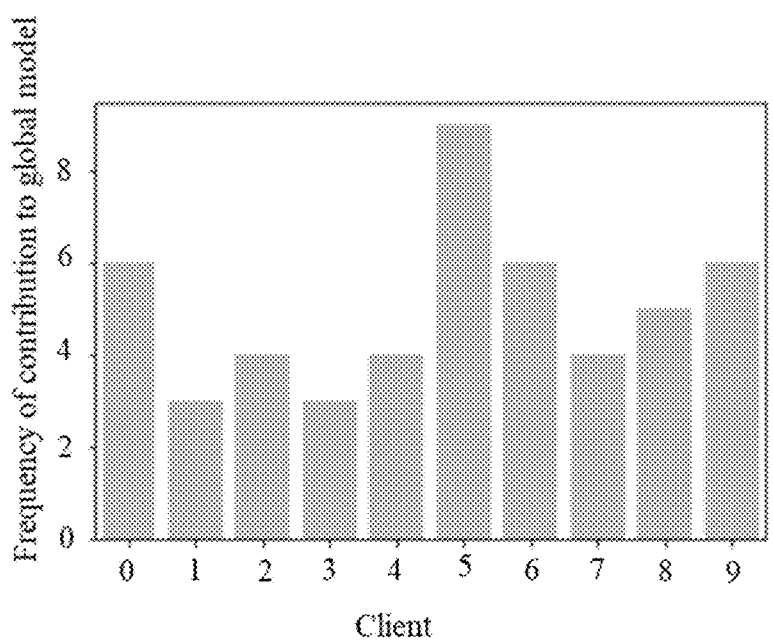

In the case of non-IID setting, the present disclosure is able to identify and limit the contribution of malicious models by the server as shown in FIG. 5B. Now referring to FIG. 5B, the malicious bank 2 504 contributed the least to the model while the malicious banks 1 and 9 did not contribute during the run. The presence of Silhouette-score-to-epsilon logic in the present disclosure made sure that no bank will be left out in the case that there are no malicious banks in the non-IID setting as shown in FIG. 5C. Now referring to FIG. 5C, it is evident that all banks from Bank 0 to Bank 9 is contributing in the non IID setting. This is achieved because the Silhouette-scores of clustering in the presence of malicious models are higher than the score with all the models set as non-malicious.

Figure 5D:
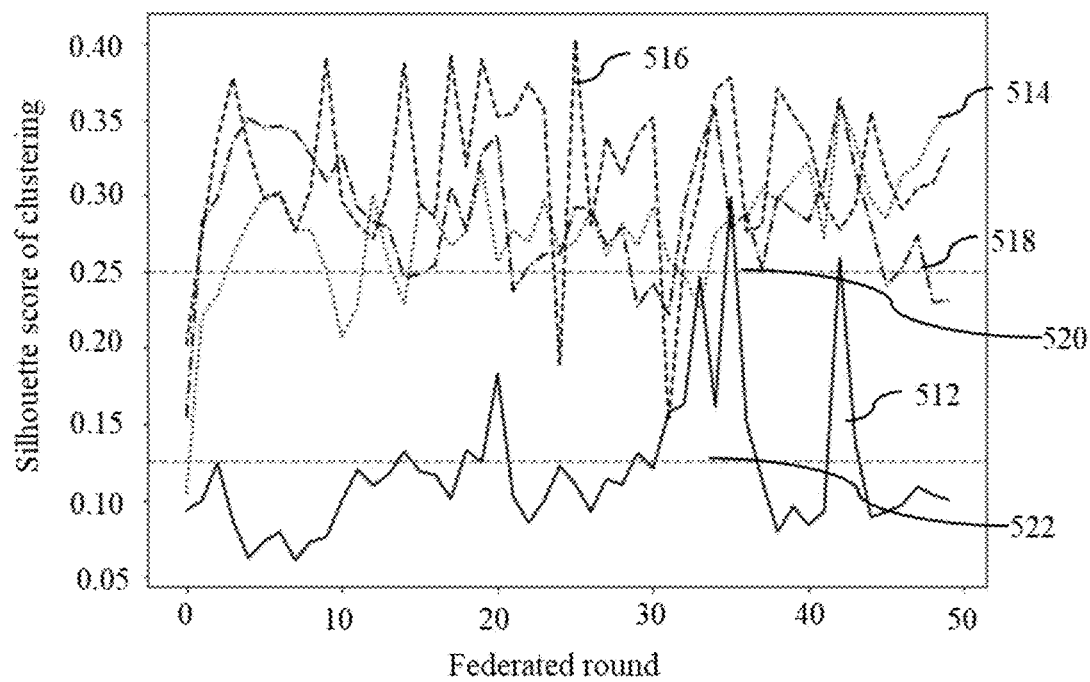

FIG. 5D shows the silhouette score obtained in each federated round for all four settings. The four settings include (i) zero poisoning (ii) poisoning with one malicious bank (iii) poisoning with 2 malicious banks and (iv) poisoning with 3 malicious banks. Now referring to FIG. 5D, the zero poisoning is shown in the line graph 512, the poisoning with one malicious bank is shown in the line graph 514, the poisoning with two malicious banks is shown in the line graph 516 and the poisoning with three malicious banks is shown in the line graph 518. Here, when there is no malicious bank (zero poisoning), the silhouette score obtained is less compared to malicious settings. The lines parallel to x axis 520 and 522 denotes the hyperparameters p and q. Further, it is evident from FIG. 5D that the present disclosure requires the tuning of two hyperparameters, the pivot points p and q. For non-IID setting with number of local epochs set to 5, the best values based on trials were found to be p=0.125 (522 of FIG. 5D) and q=0.25 (524 of FIG. 5D).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of developing a robust federated learning technique for detecting fraudulent transactions in banks with dissimilar dataset distributions and under malicious banks setting. Here, an epsilon probability and a random number based selection technique is used for selecting a cluster of models as active models to avoid bias due to cluster size. Further, the present disclosure helps to identify malicious clients or banks with maximum probability.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:

receiving, by one or more hardware processors of a server, a local classification model from each of a plurality of clients in parallel, wherein the local classification model is pretrained to classify a plurality of transactions corresponding to each of the plurality of clients as one of, a plurality of malicious transaction and a plurality of non-malicious transaction, wherein the local classification model is pretrained by:

initializing, by the server, a model;

passing, by the server, the model to the plurality of clients, wherein the plurality of clients represents a plurality of banks;

training, by each of the plurality of clients, corresponding local classification model using the model as an initial model based on corresponding datasets for a specific number of epochs or batches within an epoch by executing a ClientUpdate function by each of the plurality of clients, wherein each of the plurality of clients send the corresponding local classification model to the server during each federated round and the server collects and stores the local classification model in a model set;

obtaining, by the one or more hardware processors of the server, a set of one dimensional arrays based on a plurality of local classification models associated with the plurality of clients using a flattening technique, wherein the server using the flattening technique flattens the plurality of local classification models into a plurality of flattened vectors associated with the plurality of clients, wherein the set of one-dimensional array includes a vector representation of each of the plurality of local classification models, wherein each vector is a flattened vector corresponding to each of the plurality of local classification models associated with each of the plurality of clients;

obtaining, by the one or more hardware processors, a major cluster and a minor cluster by clustering the set of one-dimensional arrays using a clustering technique, wherein the clustering technique including a k-means clustering technique clusters the plurality of flattened vectors into two clusters resulting in the major cluster and the minor cluster;

selecting, by the one or more hardware processors, a plurality of active classification models based on the major cluster and the minor cluster using an epsilon cluster selection technique by:

computing a Silhouette coefficient for the clustering technique, wherein the Silhouette coefficient indicates the efficiency of the clustering technique, wherein the Silhouette coefficient is used to evaluate quality of the major cluster and the minor cluster obtained using the k-means clustering technique;

computing an epsilon probability value based on the Silhouette coefficient and a plurality of global parameters, wherein the plurality of global parameters are obtained based on a plurality of hyperparameters using a pretrained model, and wherein the plurality of hyperparameters are tunable and characterize a precise filtering of the plurality of active classification models, wherein the epsilon probability value is a probability with which the major cluster of models is chosen as an active set as opposed to the model set; and selecting the plurality of active models from the plurality of local classification models based on the epsilon probability value and a random number to avoid bias due to a cluster size;

selecting, by the one or more hardware processors, a global classification model from the plurality of active models using a random selection technique, wherein selection of the global classification model from the plurality of active models ensures that probability of a malicious client or bank contributing to the global classification model is minimized even if the malicious client's classification model is part of the major cluster; and transmitting, by one or more hardware processors, the selected global classification model to each of the plurality of clients;

identifying, by the server, a plurality of malicious classification models corresponding to a plurality of malicious clients which are suspicious during training and preventing the plurality of malicious classification models from contributing to the global classification model, wherein a Silhouette to epsilon logic ensures that no client or bank will be left out in the case that there are no malicious clients or banks.

2. The processor implemented method of claim 1, wherein a set of local classification models associated with the major cluster is selected as the plurality of active models if the random number is less than the epsilon probability.

3. The processor implemented method of claim 1, wherein the plurality of local classification models are selected as the plurality of active models if the random number is greater than the epsilon probability.

4. The processor implemented method of claim 1, wherein the server is directly connected to each of the plurality of clients and, wherein each of the plurality of clients are communicating with each other via the server.

5. The processor implemented method of claim 1, wherein obtaining the plurality of global parameters by the pretrained model comprises:

initializing a plurality of hyperparameters, wherein the plurality of hyperparameters are initialized based on the Silhouette coefficient, wherein a user chooses the plurality of hyperparameters from a range of the Silhouette coefficient, wherein the plurality of hyperparameters are Silhouette coefficient values that transform into epsilon probabilities;

optimizing a plurality of parameters associated with a sigmoid activation function based on the plurality of hyperparameters until a minimum loss is obtained, wherein the plurality of parameters associated with the sigmoid activation function comprises a weight parameter and a bias parameter, wherein the weight parameter and the bias parameter are computed once per federated learning process when the server is launched and initialized by executing a GetParams function by the server and stored in the server throughout the federated learning process; and selecting the plurality of parameters, associated with the sigmoid activation with minimum loss, as the plurality of global parameters, wherein the Silhouette coefficient is transformed into the epsilon probability value ε using the Silhouette to epsilon logic as, $$\varepsilon = \sigma(W_\varepsilon * x + b_s)$$

where x is a vector representing the Silhouette coefficient, $W_\varepsilon$ is the weight parameter and $b_\varepsilon$ is the bias parameter.

6. The processor implemented method of claim 1, wherein identifying the plurality of malicious classification models by the server based on the major cluster and the minor cluster, wherein the plurality of classification models associated with the minor cluster are suspected to be malicious.

7. The processor implemented method of claim 1, wherein the local classification model is malicious if the local classification model is trained from a client's data set whose one or more data labels are flipped, wherein a label field of a transaction is flipped from '0' to '1' or from '1' to '0' in label flipping, wherein the server follows synchronous aggregation strategy where the server waits for the plurality of clients to update their respective models to the server during a federated round and then the server performs the selection of the plurality of active models, wherein the malicious client or bank is simulated by training the client with a flipped dataset, wherein when the Silhouette coefficient is 1, then a cluster is dense and separated than other clusters and the Silhouette coefficient is near 0 represents overlapping clusters with samples close to a decision boundary of neighboring clusters and a negative Silhouette coefficient indicates that the samples are assigned to wrong clusters.

8. A system comprising:
a plurality of clients connected to a server, wherein the server comprises at least one memory storing programmed instructions; one or more Input/Output (I/O) interfaces; and
one or more hardware processors operatively coupled to the at least one memory, wherein the one or more hardware processors are configured by the programmed instructions to:
receive a local classification model from each of a plurality of clients in parallel, wherein the local classification model is pretrained to classify a plurality of transactions corresponding to each of the plurality of clients as one of, a plurality of malicious transaction and a plurality of non-malicious transaction, wherein the local classification model is pretrained by:
initializing, by the server, a model;
passing, by the server, the model to the plurality of clients, wherein the plurality of clients represents a plurality of banks;
training, by each of the plurality of clients, corresponding local classification model using the model as an initial model based on corresponding datasets for a specific number of epochs or batches within an epoch by executing a ClientUpdate function by each of the plurality of clients, wherein each of the plurality of clients send the corresponding local classification model to the server during each federated round and the server collects and stores the local classification model in a model set;
obtain a set of one dimensional arrays based on a plurality of local classification models associated with the plurality of clients using a flattening technique, wherein the server using the flattening technique flattens the plurality of local classification models into a plurality of flattened vectors associated with the plurality of clients, wherein the set of one-dimensional array includes a vector representation of each of the plurality of local classification models, wherein each vector is a flattened vector corresponding to each of the plurality of local classification models associated with each of the plurality of clients;
obtain, a major cluster and a minor cluster by clustering the set of one-dimensional arrays using a clustering technique, wherein the clustering technique including a k-means clustering technique clusters the plurality of flattened vectors into two clusters resulting in the major cluster and the minor cluster;
select a plurality of active classification models based on the major cluster and the minor cluster using an epsilon cluster selection technique by:
computing a Silhouette coefficient for the clustering technique, wherein the Silhouette coefficient indicates the efficiency of the clustering technique, wherein the Silhouette coefficient is used to evaluate quality of the major cluster and the minor cluster obtained using the k-means clustering technique;
computing an epsilon probability value based on the Silhouette coefficient and a plurality of global parameters, wherein the plurality of global parameters are obtained based on a plurality of hyperparameters using a pretrained model, and wherein the plurality of hyperparameters are tunable and characterize a precise filtering of the plurality of active classification models, wherein the epsilon probability value is a probability with which the major cluster of models is chosen as an active set as opposed to the model set; and
selecting the plurality of active models from the plurality of local classification models based on the epsilon probability value and a random number to avoid bias due to a cluster size;
select a global classification model from the plurality of active models using a random selection technique, wherein selection of the global classification model from the plurality of active models ensures that probability of a malicious client or bank contributing to the global classification model is minimized even if the malicious client's classification model is part of the major cluster; and
transmit the selected global classification model to each of the plurality of clients;
identify, by the server, a plurality of malicious classification models corresponding to a plurality of malicious clients which are suspicious during training and preventing the plurality of malicious classification models from contributing to the global classification model,
wherein a Silhouette to epsilon logic ensures that no client or bank will be left out in the case that there are no malicious clients or banks.

9. The system of claim 8, wherein a set of local classification models associated with the major cluster is selected as the plurality of active models if the random number is less than the epsilon probability.

10. The system of claim 8, wherein the plurality of local classification models are selected as the plurality of active models if the random number is greater than the epsilon probability.

11. The system of claim 8, wherein the server is directly connected to each of the plurality of clients and, wherein each of the plurality of clients are communicating with each other via the server.

12. The system of claim 8, the method of obtaining the plurality of global parameters by the pretrained model comprises:
   initializing a plurality of hyperparameters, wherein the plurality of hyperparameters are initialized based on the Silhouette coefficient;
   optimizing a plurality of parameters associated with a sigmoid activation function based on the plurality of hyperparameters until a minimum loss is obtained, wherein the plurality of parameters associated with the sigmoid activation function comprises a weight parameter and a bias parameter; and
   selecting the plurality of parameters, associated with the sigmoid activation with minimum loss, as the plurality of global parameters.

13. The system of claim 8, wherein identifying the plurality of malicious classification models by the server based on the major cluster and the minor cluster, wherein the plurality of classification models associated with the minor cluster are suspected to be malicious.

14. One or more non-transitory machine-readable information storage mediums comprising one or more instructions which when executed by one or more hardware processors cause:
   receiving a local classification model from each of a plurality of clients in parallel, wherein the local classification model is pretrained to classify a plurality of transactions corresponding to each of the plurality of clients as one of, a plurality of malicious transaction and a plurality of non-malicious transaction, wherein the local classification model is pretrained by:
      initializing, by the server, a model;
      passing, by the server, the model to the plurality of clients, wherein the plurality of clients represents a plurality of banks;
      training, by each of the plurality of clients, corresponding local classification model using the model as an initial model based on corresponding datasets for a specific number of epochs or batches within an epoch by executing a ClientUpdate function by each of the plurality of clients, wherein each of the plurality of clients send the corresponding local classification model to the server during each federated round and the server collects and stores the local classification model in a model set;
   obtaining, a set of one dimensional arrays based on a plurality of local classification models associated with the plurality of clients using a flattening technique, wherein the server using the flattening technique flattens the plurality of local classification models into a plurality of flattened vectors associated with the plurality of clients, wherein the set of one-dimensional array includes a vector representation of each of the plurality of local classification models, wherein each vector is a flattened vector corresponding to each of the plurality of local classification models associated with each of the plurality of clients;
   obtaining a major cluster and a minor cluster by clustering the set of one-dimensional arrays using a clustering technique, wherein the clustering technique including a k-means clustering technique clusters the plurality of flattened vectors into two clusters resulting in the major cluster and the minor cluster;
   selecting a plurality of active classification models based on the major cluster and the minor cluster using an epsilon cluster selection technique by:
      computing a Silhouette coefficient for the clustering technique, wherein the Silhouette coefficient indicates the efficiency of the clustering technique, wherein the Silhouette coefficient is used to evaluate quality of the major cluster and the minor cluster obtained using the k-means clustering technique;
      computing an epsilon probability value based on the Silhouette coefficient and a plurality of global parameters, wherein the plurality of global parameters are obtained based on a plurality of hyperparameters using a pretrained model, and wherein the plurality of hyperparameters are tunable and characterize a precise filtering of the plurality of active classification models, wherein the epsilon probability value is a probability with which the major cluster of models is chosen as an active set as opposed to the model set; and
      selecting the plurality of active models from the plurality of local classification models based on the epsilon probability value and a random number to avoid bias due to a cluster size;
   selecting a global classification model from the plurality of active models using a random selection technique, wherein selection of the global classification model from the plurality of active models ensures that probability of a malicious client or bank contributing to the global classification model is minimized even if the malicious client's classification model is part of the major cluster; and
   transmitting, the selected global classification model to each of the plurality of clients;
   identifying, by the server, a plurality of malicious classification models corresponding to a plurality of malicious clients which are suspicious during training and preventing the plurality of malicious classification models from contributing to the global classification model,
   wherein a Silhouette to epsilon logic ensures that no client or bank will be left out in the case that there are no malicious clients or banks.

15. The one or more non-transitory machine-readable information storage mediums of claim 14, wherein a set of local classification models associated with the major cluster is selected as the plurality of active models if the random number is less than the epsilon probability.

16. The one or more non-transitory machine-readable information storage mediums of claim 14, wherein the plurality of local classification models are selected as the plurality of active models if the random number is greater than the epsilon probability.

17. The one or more non-transitory machine-readable information storage mediums of claim 14, wherein the server is directly connected to each of the plurality of clients and, wherein each of the plurality of clients are communicating with each other via the server.

18. The one or more non-transitory machine-readable information storage mediums of claim 14, the method of obtaining the plurality of global parameters by the pretrained model comprises:
   initializing a plurality of hyperparameters, wherein the plurality of hyperparameters are initialized based on the Silhouette coefficient;
   optimizing a plurality of parameters associated with a sigmoid activation function based on the plurality of hyperparameters until a minimum loss is obtained, wherein the plurality of parameters associated with the sigmoid activation function comprises a weight parameter and a bias parameter; and selecting the plurality of parameters, associated with the sigmoid activation with minimum loss, as the plurality of global parameters.

19. The one or more non-transitory machine-readable information storage mediums of claim 14, wherein the one or more instructions which when executed by the one or more hardware processors cause identifying the plurality of malicious classification models by the server based on the major cluster and the minor cluster, wherein the plurality of classification models associated with the minor cluster are suspected to be malicious.

* * * * *